United States Patent [19]

Cline et al.

[11] Patent Number: 5,323,593
[45] Date of Patent: Jun. 28, 1994

[54] METHOD AND APPARATUS FOR MOWING LAWNS

[76] Inventors: Lohn G. Cline, 12 Greenview Ave., Reistertown, Md. 21136; William F. Cline, Box 345, Star Rte., Rector, Pa. 15677

[21] Appl. No.: 3,749

[22] Filed: Jan. 13, 1993

[51] Int. Cl.$^5$ .................. A01D 34/64; A01D 34/74; A01D 34/78; A01D 69/02
[52] U.S. Cl. ........................... 56/10.2; 56/10.7; 56/11.9; 56/17.1; 56/255; 136/291
[58] Field of Search .................. 56/11.9, 10.2, 10.5, 56/10.6, 255, 16.7, 17.1, 17.2, 17.5, 10.7; 136/291; 180/2.2, 65.3

[56] References Cited

U.S. PATENT DOCUMENTS

| | | | |
|---|---|---|---|
| 3,570,227 | 3/1971 | Bellinger | 56/11.9 |
| 3,698,523 | 10/1972 | Bellinger | 192/12 BA |
| 4,333,302 | 6/1982 | Thomas et al. | 56/10.6 X |
| 4,942,723 | 7/1990 | Wassell | 56/10.6 |
| 4,987,729 | 1/1991 | Paytas | 56/11.9 |
| 5,007,234 | 4/1991 | Shurman et al. | 56/10.2 R |
| 5,019,983 | 5/1991 | Schutten et al. | 56/10.2 X |
| 5,222,349 | 6/1993 | Fasseuer | 56/12.8 |

Primary Examiner—Stephen J. Novosad
Attorney, Agent, or Firm—Lawrence R. Burns

[57] ABSTRACT

The present invention discloses an unattended lawn mowing system in which multiple solar powered self propelled, random motion lawn mowers are used singly or in combination to mow a pre-defined lawn area. The mowing zone is defined as a region of grass bounded by naturally occurring or man made obstacles of infinite variation including, but not limited to, high grass, flowers, trees, fences and lawn edging. Each mowing unit is a solar powered, self-propelled, random motion lawn mower which comprises a frame with a set of drive and coaster wheels on the frame. A set of batteries and battery powered electric motors are mounted on said frame with output means from the motors to power drive wheels and a cutting mechanism on the frame. Photovoltaic panels are mounted on said frame to receive solar rays and convert them into electrical power to charge the batteries with means for controlling the orientation of the solar panels so as to face the direction of greatest solar intensity. The actuation of the mower is controlled by monitoring means that detects the battery charge level and the solar energy output of the panels. Such actuation modes include starting the mower, stopping the mower, altering the direction of travel of the mower and re-charging the batteries of the mower. Random motion of the mowers is accommodated by providing contact switches on the outer periphery of the frame of the mower so that direction of the mowers is changed by more than 90 degrees when the contact switches impact a physical barrier surrounding or within the area to be cut. The mower further includes switch means so constructed that the solar cells are connected to said batteries in a manner that allows for automatic switching between batteries for optimum use and re-charging.

26 Claims, 4 Drawing Sheets

METHOD AND APPARATUS FOR MOWING LAWNS

BACKGROUND OF THE INVENTION

This invention discloses an unattended lawn mowing system and mechanisms that are solar powered and self actuated, continuously operable, self propelled and random motion mowing devices.

The present day common practice of lawn care uses attended mowing machines that usually include reel or rotary, push-type or self propelled machines powered by gasoline or electrical motors. Such machines are typically stored in a shed or garage until desired operation and are then started and guided over the area to be mowed by a human operator. When the task of mowing the lawn is finished the machine is then stopped and returned to the storage area until further needed to reduce the height of the grass in the area that has been mowed.

Prior art devices not found in common practice today are mowing devices using solar power. U.S. Pat. No. 4,987,729 and 4,942,723 disclose devices similar to the common operator guided (attended) lawn mower, with the exception that the typical gasoline powered motor is replaced by a solar powered electrical motor.

Approaches to unattended mowing devices have been disclosed in U.S. Pat. Nos. 3,570,227 and 3,698,523. The devices disclosed therein have the need for sophisticated electronic boundary hardware and the required attendance of an operator at the beginning, often during, and at the end of relatively short periodic mowing sessions.

Another approach to unattended mowing devices is disclosed in U.S. Pat. No. 5,007,234 but depends on sophisticated equipment to detect the height of the grass to begin and stop operation.

First, the random mowing procedure suggested by the fore mentioned U.S. Pat. No. 3,570,227 is significantly improved upon and simplified by the herein invention eliminating all electronic signal transmitting boundary equipment and all on board signal receiving equipment.

Secondly, the extent of operator attendance is significantly reduced through automatic accommodation of transient obstacles and the elimination of specific mowing sessions, which in turn reduces the time required for start-up, shut-down, and storage procedures.

Periphery sensors on each mowing device respond to an infinite variety of physical obstacles; the locations of which can be of a transient nature. For example, the addition or deletion of a tree or shrub or the simple placement of a child's toy will not hinder the effectiveness of the cutting systems.

Furthermore, the mowing device is equipped with on board circuitry to assure efficient use of the sun's power. This is accomplished by mounting of the photovoltaic cells in a manner to allow optimum sun conjunction with motorized linear or angular actuators. The sun tracking mechanisms and circuitry can be derived from existing technology.

Additionally, the on board circuitry will control the mowing device's motion, on off operation, battery recharging periods, and anti-theft alarm signals.

Simultaneous electronic monitoring of the photovoltaic output and power level of the battery(s) as the device is in motion also improves efficiency of the device through selective avoidance of heavily shaded areas.

OBJECTS OF THE PRESENT INVENTION

It is an object of the present invention to provide a system of lawn mowing comprised of a number of identical unattended mowing devices operating within naturally occurring and/or man-made boundaries in a self-propelled random manner, utilizing solar power as the singular energy source.

It is an object of the present invention to provide continuously operable mowers to maintain a constant height of grass.

It is an object of the present invention to provide continuously operable, solar powered, self-propelled, random motion, unattended, mowing machines.

It is an object of the present invention to provide random motion mowing machines operable within a perimeter consisting of naturally occurring (high grass, flowers, stones) or man-made obstacles of infinite variety (fences, edging, wires).

It is an object of the present invention to provide a method of maintaining grass at a desired cut height through repeated trimming of the grass within the area by the use of one or more of unattended, random motion, self propelled, solar powered cutting machines.

It is a still further object of the present invention to provide solar operated unattended cutting machines to continuously cut grass throughout the growing season.

It is an object of the present invention to provide solar powered, unattended cutting machines that at times will operate into directions of greatest solar intensity.

It is a still further object of the present invention to tailor a cutting machine system to the specific lawn to be maintained by determining the required number and size of the fore mentioned devices through consideration of such factors as; the area of the lawn, the amount of shade within the area, the latitude/climate of the area, the amount of operator attendance deemed acceptable, and the type and/or condition of the grass.

It is a still further object of the present invention to provide multiple individual mowing devices so as to enhance the system's reliability and effectiveness.

It is a still further object of the present invention to maintain the pre-cut height of the grass of a selected lawn within specific height limits.

It is still a further object of the present invention to selectively avoid shaded areas to enhance low battery performance and improve the stand still battery charging by positioning the mower in location of high solar intensity.

BRIEF SUMMARY OF THE INVENTION

The present invention comprises a random motion lawn mower having a frame to which is operatively connected a grass cutting mechanism and drive means for moving the cutting mechanism over the surface of a lawn. A drive means and combination drive and coaster wheels are mounted on the frame so that the drive means may be selectively connected to one or more of the combination wheels to control the direction of the mower. The wheel drive means comprises electric motor means mounted on the frame for individually driving the wheels, with the electric motor means also providing power for driving the cutting mechanism.

In the preferred embodiment of the invention three sets of wheels are provided and are positioned 120 degrees apart around a circular frame of the mower. An electric motor powers the wheels and is located in a turret mechanism above the frame of the mower and is operatively connected to the wheels so that one set of wheels is powered at a given time. To affect a change in direction of travel of the mower the drive turret is repositioned over another set of wheels 120 degrees to the right or left depending on the circuitry. As the drive motor turret rotates 120 degrees all three sets of wheels rotate horizontally in the same direction as a result of the gear at the base of the turret interacting with the gears of the wheel assembly cylinders.

The cutting mechanism on the frame may comprise traditional cutting mechanisms for trimming grass but is preferably comprised of a cutting mechanism that has stationary cutting edges on the frame and rotary cutting edges on a co-operating rotary blade to shear the grass between the two edges.

Associated with the electric motor means for driving the wheels and the cutting mechanism is a rechargeable energy means for powering the electric motor means. The rechargeable energy means comprises batteries, preferably nickel cadmium batteries, that are supplied energy by multiple solar panels on the frame.

The direction of the mower or mowers during the cutting operation is controlled by means on the frame to respond to physical barriers to change the wheel drive means to a different set of wheels. The wheels are preferably located at obtuse radius angles from one another, preferably of 120 degrees, so that switching the drive means to a different wheel will change the direction of travel by 120 degrees. Contact switches on the outer perimeter of the frame provide a responsive means for contact with physical barriers encountered by the mower to switch direction.

The present invention also comprises means for monitoring the output of the solar panels and the rechargeable energy means so as to alter the operation of the mower to optimize the use of the available solar intensity. Such means includes an operation method for satisfying the power requirements of the mower from one of the batteries while re-charging the other battery. The method preferably would completely discharge the operating battery before beginning to re-charge that battery.

The present invention also comprises means for tracking the direction of optimum solar intensity and aligning the solar panels with the optimum solar intensity direction. Preferably the solar panels are comprised of at least three individual panels on vertical centerlines and located radially one hundred twenty degrees apart from one another. The solar panels preferably comprise photovoltaic cells. Circuitry means are provided for activating and de-activating the mower operation depending on the solar intensity striking the solar panels. Also provided is circuitry means on the mower for avoiding shaded areas during certain power configurations of the mower electrical drive means. Such method of operation requires monitoring means for detecting solar energy output from the panels, and battery energy charge levels, so as to avoid shaded areas under predetermined conditions. Such a monitoring means will be operatively connected with means for automatically starting and stopping the mower operations depending on the levels of battery energy and solar panel output.

The present invention further contemplates the method of mowing a lawn which comprises the steps of providing a physical barrier around the perimeter of an area to be mowed and providing self-driven, unattended, battery operated mowing devices within the perimeter of the area to be mowed. The method includes the step of providing rechargeable battery means for operating the mowing device, solar panels for re-supplying energy to the batteries and providing mower actuation means controlled by monitoring devices that detect and compare solar panel energy output with battery charge level so as to allow the mower to re-charge during weak battery periods and to tell the mower to avoid shaded areas during certain weak battery periods. The method further includes the step providing two batteries for the battery means, with one of the two batteries for driving the mowing device and the other of the two batteries for accepting a charge from the solar electrical output means, and providing circuitry for switching the connections between batteries when the drive battery charge is depleted and the other battery is fully charged.

The method further includes the step of providing electrical contact on the radially outward perimeter of the frame of the mowing devices that will change the mower direction upon contact with physical barriers by more than 90 degrees.

The method further contemplates the step of starting the mower operation when the monitors detect a fully charged battery and a solar energy output greater than zero, with said fully charged battery being the drive battery and further includes the step of stopping the mower operation when the charge on the drive battery is depleted and the other battery is not fully charged. Further contemplated is the step of changing the direction of the mowing device when the non-drive battery is not fully charged and the drive battery charge level is below a pre-determined level and the solar energy electrical output is below a pre-determined level.

A further step of the method of the present invention is the step of providing a mount and motor means for each solar panel and means for controlling the panels so that they face towards the direction of greatest solar intensity during mower standstill re-charging.

With the above apparatus and method in mind it is the intention of the present invention to provide a system of lawn mowing comprised of a number of identical unattended mowing devices operating within naturally occurring and/or man-made boundaries in a self-propelled random manner, utilizing solar power as the singular energy source.

A constant height of grass will be maintained, within predetermined limits, by means of solar powered, self-propelled, random motion, unattended, cutting device(s) in conjunction with physical boundaries which may comprise naturally occurring (high grass, flowers, stones) or man-made obstacles of infinite variety (fences, edging, wires) found within and on the periphery of a selected cutting area.

More specifically, a bounded area of natural grass will be maintained at a desired cut height through repeated trimming of the grass within the area by the use of one or more of the unattended, random motion, self propelled, solar powered cutting devices.

Each primary cutting device operates independent of another and without operator intervention. Through periphery electrical contacts located on each cutting device, the device will sense contact with boundary and/or internal obstacles and alter its direction.

By the repeated changes in direction and by naturally occurring topography and irregularities of terrain, the motion of the devices will be random.

The system will be tailored to the specific lawn to be maintained by determining the required number and size of the fore mentioned devices through consideration of such factors as; the area of the lawn, the amount of shade within the area, the latitude/climate of the area, the amount of operator attendance deemed acceptable, and the type and/or condition of the grass.

DETAILED DESCRIPTION OF THE INVENTION

Figure 1:
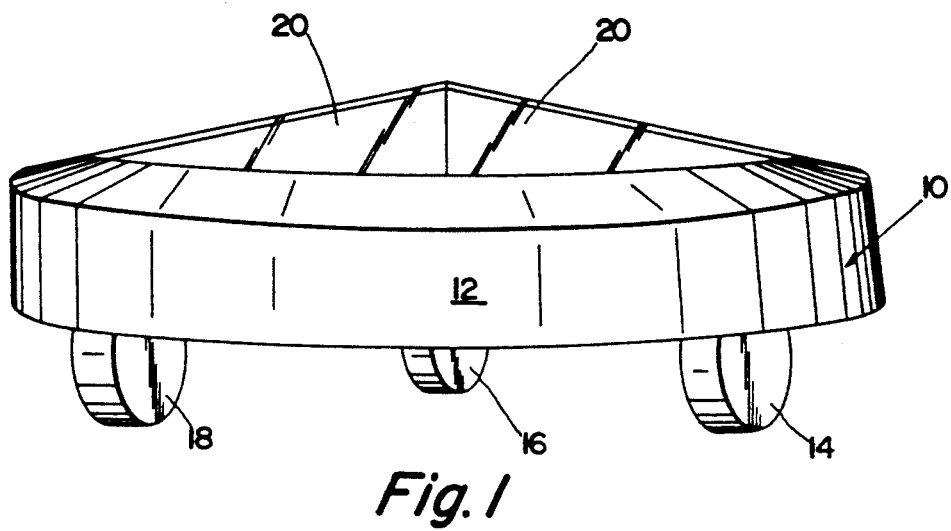
FIG. 1 is a perspective view of a mowing machine according to the present invention.

What is shown in FIG. 1 is an individual mower unit 10 having an outer frame 12 or bumper panel that serves to actuate contact switches which will be described later on. The individual mower unit 10 has preferably three sets of wheels shown at 14, 16, and 18. The wheels are used to move the individual mower unit over the surface of the lawn with at least one of the sets of wheels 14, 16 or 18 being a drive set while the other sets act as coaster wheels. On top of the individual mower unit 10 are solar panels shown as at 20, for converting solar energy to electrical energy and directing that energy to rechargeable batteries.

Figure 2:
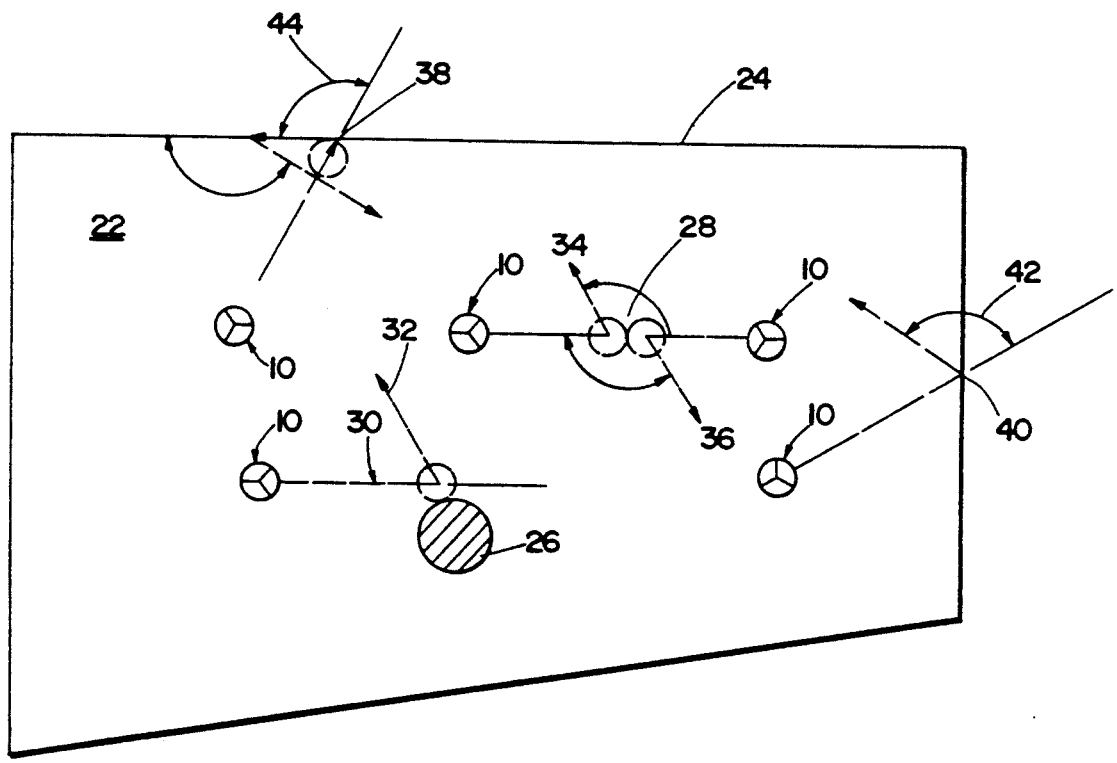
FIG. 2 is a plan view of a lawn area with a system of mowing machines according to the present invention.

Shown in FIG. 2 is a lawn area designated as 22 having a boundary shown by a solid line 24 surrounding the area 22 a lawn that is desired to be cut. Multiple individual units 10 are shown in the lawn area 22 and it is the intention of this invention that the individual units will have a random motion throughout area 22. In the event that the boundary 24 is a physical boundary surrounding the area 22 of the lawn to be cut and as previously described may be natural or man made boundaries. In the area 22 are obstacles such as shown at 26 and the interaction of two individual units as shown at 28. Referring now to the obstacle 26, the individual unit 10, would proceed in a straight line fashion as indicated at arrow 30, until the individual unit 10 struck the object 26. At that point the individual unit 10 would go off in a direction as at arrow 32 that being an angle of preferably 120 degrees from the original direction from the angle of incidence of the individual unit 10 striking the foreign object. Shown at the intersection at 28 are the two individual units 10 interfering with their own straight line operations such that the respective units 10 turn again 120 degrees and follow the arrows 34 and 36. The boundary 24 also shows the interferences as 38 and 40 on the boundary 24 will cause the individual mower units 10 to again change their directions by 120 degrees as shown by arrows 42 and 44. Arrows 42 and 44 are representative of the 120 degree change in direction of operation. What is shown in FIG. 2 is the individual mower units 10 turning at an angle of 120 degrees. It is the intention of this invention that the turn be at least more than 90 degrees from the direction of travel. In other words that it would turn at an acute included angle from the direction from which the individual unit had proceeded. Again in FIG. 2 what is shown is that the individual units are turning to the left when striking the obstructions as shown at 26 or 28 or boundary 24. It is preferable that the units turn left, although it would be within the contemplation of the invention that some mechanism could turn the unit either left or right. In the event that the unit turns left and strikes another object it will again turn left by 120 degrees so as to completely turn itself about by two contacts with an obstruction.

Figure 3:
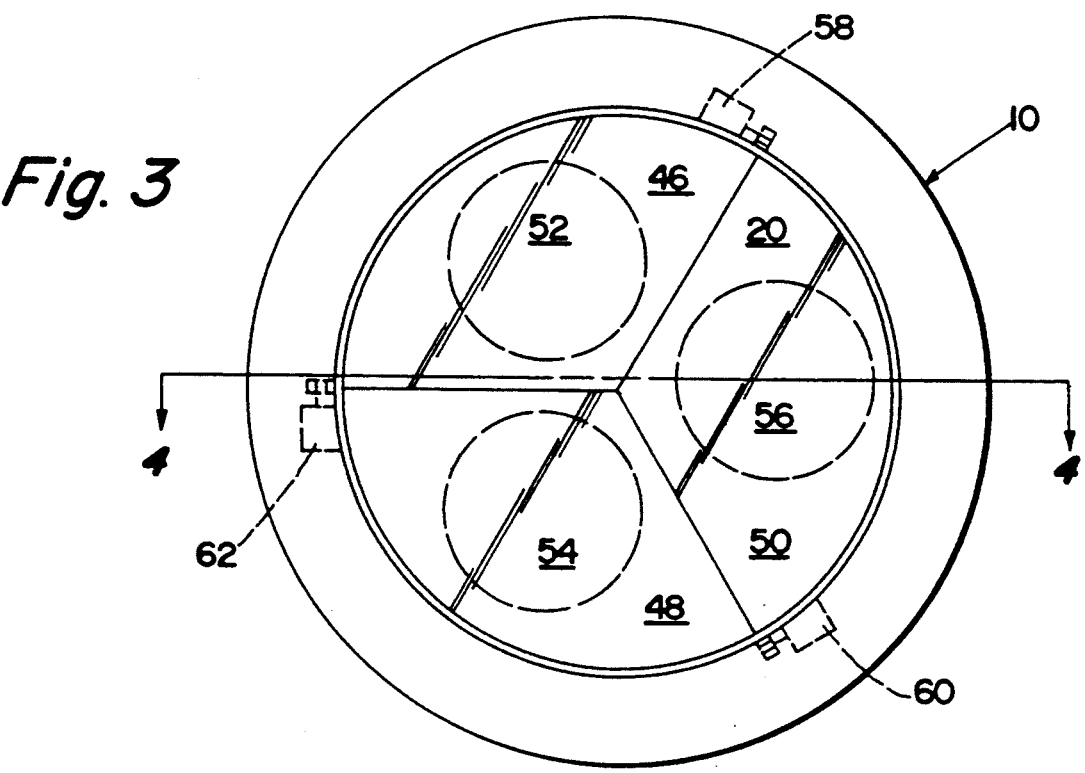
FIG. 3 is a plan view of a mowing machine according to the present invention.

Shown in FIG. 3 is a plan view of the individual mower unit 10 shown in FIG. 1. In FIG. 3 the solar panels 20 are shown as 3 individual units 46, 48, and 50. Located directly beneath the three individual solar panels 46, 48 and 50, are the individual wheel wells 52, 54, and 56, which are preferably aligned directly under the individual panels. The reason for this will become clear in the later part of the detailed description. The individual actuators shown at 58, 60 and 62 are actuators for raising or lowering the perimeter of the solar panels so as to be able to tilt the panels to face in the direction of the greatest solar intensity during the standstill re-charging operation. It is intended that the actuators 58, 60 and 62 will come into operation when the individual mower unit 10 is sitting still on the lawn area 22 to be mowed, and both batteries have been drained, and one is being recharged. At that point the unit would address the solar panels 46, 48, and 50 so that they are tilted in the direction of the greatest solar intensity.

Figure 4:
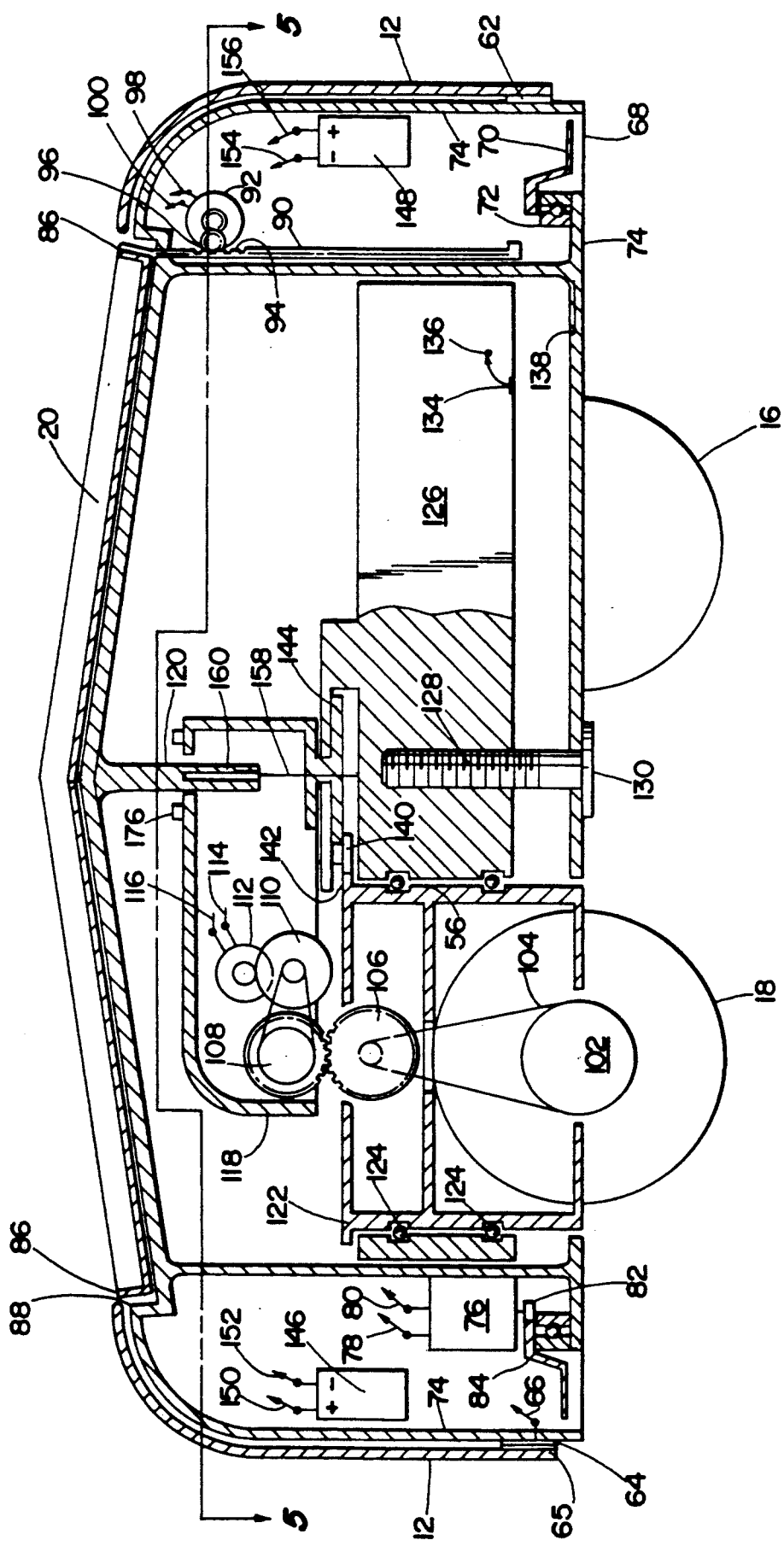
FIG. 4 is a cross sectional view of a mowing machine according to the present invention.

Shown in FIG. 4 is a cross sectional view IV—IV from FIG. 3, and this more clearly identifies the outer panel 12 as being a bumper panel that is capable of providing an electrical signal to change the direction of travel of the mower unit 10. The outer shell 12 is shown in FIG. 4 having a support damper 62 that holds the outer panel 12 away from the inner frame 74 and separates the electrical contact which, is shown at 64. When the individual mower unit 10 runs into an obstacle, the bumper panel 12 will compress the support damper material 62. When the compression is sufficient, the electrical contact switch shown at 64 will be closed and provide an electrical signal through wire 66. Shown also in FIG. 4 is the preferred cutting mechanism, shown with stationary shearing blades 68 and a rotary shearing blade 70. The rotary shearing blade 70 is shown mounted on a bearing assembly 72 which in turn is shown mounted on an inner frame 74 of the individual mower unit 10. A drive motor 76 is provided with electrical signal wire 78 and 80 and an individual gear 82, so that the gear 82 cooperates with the gear 84 to drive the rotary shearing blade 70 in rotation as it shears the tips of the lawn that are caught between the blades 68 and 70. In FIG. 4, gear 84 is shown formed as an integral part of, and on the inside diameter of, the shear blade 70.

Referring to the outer bumper 12 again, the contact switch shown at 64 comprises contact 65 mounted on the bumper panel 12, and contact 66 which is mounted on the inner frame 74 of the individual mower unit 10. Shown also on FIG. 4 is a solar panel assembly 20 which sets in a pan 86. The pan 86 is a separate unit that sets in a well shown at 88 formed in the inner frame assembly 74 of the individual mower unit 10. The pan 86 is connected to actuator rods 90, and an actuator motor 92 shown in FIG. 4 may be any of the actuator motors shown in FIG. 3 and labeled as 58, 60 and 62. Shown in FIG. 4 is the typical operation where the actuator rod 90 has individual gear teeth 94 that mesh with the gear 96 and act in a rack and pinion fashion, such that when actuator motor 92 receives an electrical signal through wires 98 and 100 the panel will be raised or lowered in accordance with its predetermined instructions.

Shown in FIG. 4 are the representative wheels as are shown at 16 and 18. The wheel 18 is located in wheel well 56 as shown previously in FIG. 3. As can be seen, which is typical of the wheel members, FIG. 4 shows wheel 18 having a wheel hub 102 for accommodating a belt 104. The belt 104 is driven by gear pulley 106 mating with another gear pulley 108 which in turn mates with another gear pulley 110, and is driven by gear motor 112; gear motor 112 is provided with electrical signals through wires 114 and 116. When the gear pulley 108 mates with the gear pulley 106, wheel 18 becomes a drive wheel rather than a coaster wheel. Gear pulleys 108 and 110, and gear motor 112 are housed in a turret mechanism shown at 118. The turret mechanism 118 is rotatable about a center post 120 which forms a part of the inner frame 74. Shown in FIG. 4 is a wheel cylinder 122 that is shown mounted with bearings 124 so that it is rotatable within the wheel well 56. The wheel well 56 is formed as the cylindrical hole through the wheel frame 126 as shown in FIG. 4. Threaded into the center part of the frame 126 is a bolt 128 having a cap head 130 thereon. The bolt 128 is used to operatively adjust the height of the cut of the lawn by moving the frame 126 relative to the shearing blades 68 and 70 and thereby raise and lower the frame 74 in relation to the wheel frame 126. In this manner the shearing blades 68 and 70 will be adjusted to the height of the lawn to be cut. Shown also in FIG. 4 is an on/off electrical contact as is shown at 134 having an electrical wire 136 and an opposite contact 138. Should it occur that the mower unit is picked up off the ground, the contact 134 will close thereby turning the mower off, or turning the mower off and sounding an alarm. Shown in FIG. 4 is a central turret gear 144 that through gear 140 drives the wheel cylinder 122 in rotation when desired. The turret gear 144 and gear 140 will be shown more clearly in FIG. 5. The gear 140 meshes with cooperating gear teeth 142 on the upper part of the wheel cylinder 122, and also with the central turret gear 144. Shown also in FIG. 4 are the rechargeable batteries 146 and 148. The batteries 146 and 148 are preferably nickel cadmium type rechargeable batteries and have electrical conductors 150 and 152 connecting battery 146 and conductors 154 and 156, connecting battery 148 to the output of the solar energy panels and to monitoring circuits. Shown also on FIG. 4 is a center rod 158 that is press fit into a blind hole in the center of the wheel frame 126 and slides vertically within the cavity shown at 160 of the center post 120 on the inner frame 74.

Figure 5:
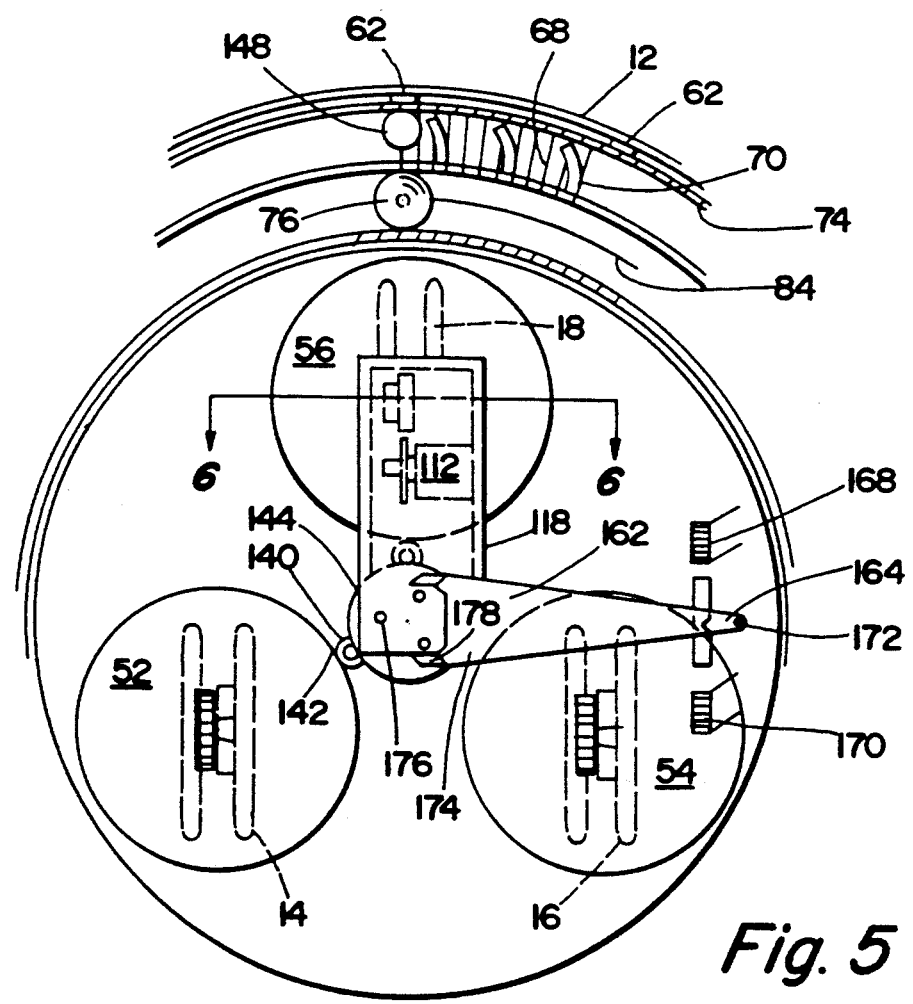
FIG. 5 is a sectional view of the mowing machine according to the present invention.

FIG. 5 shows section V—V of FIG. 4. Shown outermost in FIG. 5 is the bumper shell 12 being mated with the support damper material 62 and mating inner most with the inner frame 74. Blades 68 and 70 are shown in relation to one another in FIG. 5 that will be later described in FIG. 7. Also shown in FIG. 5 is one of the nicad batteries 148, motor 76 and gear 84 which is integral to rotating blade 70 previously described. Shown in FIG. 5 are the wheel wells 52, 54, and 56 shown in their relative positions and having their wheel sets 14, 16, and 18. Shown therein is the turret mechanism 118, having a turret actuating arm 162. The turret actuation arm 162 has an end 164 with a metal bar 166 located thereon. The metal bar 166 has opposing ends that may be attracted by electromagnets 168 and 170 as is typically found in solenoid mechanisms. Upon actuation of the magnet 168, the bar 166 will go over and engage the magnet 168 so that the turret actuator arm 162 is rotated. The turret actuator arm pivots about pin 172, which extends through the end 164 of the actuator arm 162. In this manner the opposing end 174 of the actuator arm 162 engages the three pins 176 which are located on radial center lines 120 degrees from each other and are embedded in the turret frame. Located on the end 174 of the turret actuator arm 162 are pivotal fingers 178 that will engage the pins 176 that rotate the turret housing 118, 120 degrees so as to move the housing from the wheel 18 to wheel 14 and engage the drive mechanism therewith. Simultaneously, central turret gear 144 is rotated engaging all three gears 140, which in turn engage all three wheel cylinder gears 142, so as to rotate the wheels and align them in a new direction of travel of the mower unit 10. The pivotal fingers 178 are made so as to provide a positive rotation of the pins 176 when the actuator arm 162 is rotated in a clockwise direction, but will pivot out of the way of pins 176 so as to let it pass when rotated in a counter-clockwise direction. The mechanism shown in FIG. 5 allows the individual mower unit to turn left or right. The pivotal fingers are necessary so that the turret actuator arm 62 may return to its neutral position after the magnets have been deenergized. The finger shown opposite 178 will operate in direct contrast to the description given for 178, this is so that unit may turn left or right when it is in its shade avoidance mode, in contrast to the obstacle avoidance mode.

Figure 6:
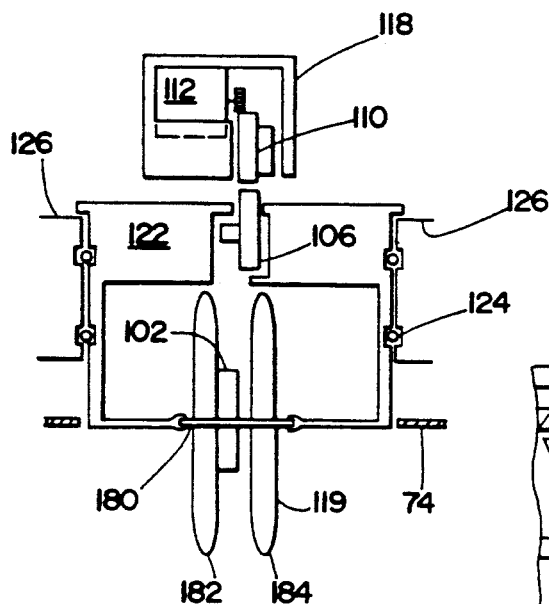
FIG. 6 is a partial cross section of the wheel drive motor positioned over the drive wheels and the motor engagement according to the present invention.
Figure 7:
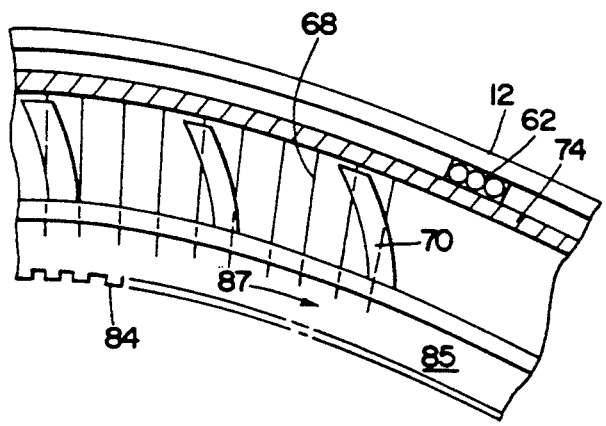
FIG. 7 is a partial sectional view of the cutting mechanism of the present invention.

Shown in FIG. 6 is the sectional view through VI—VI of FIG. 5. FIG. 6 shows a clearer view of the wheel well and wheel assembly shown previously in FIG. 4. What is shown new in FIG. 6 is the axle 180 holding the set of wheels 182 and 184 together to form the wheel set 118. Shown in FIG. 7 is the outer bumper 12 separated by the compressible damper 62 from the inner frame 74. Preferably the support damper 62 need not be a continuous ring around the adjacent inner perimeter of the bumper 12, but may be pads shown as adhesively bonded to the inner structure 74 and holding the bumper shell 12 out of electrical contact with the inner structure 74. Rotating shearing blades 70 are shown above the stationary blade 68 and the drive gear 84 are shown formed inwardly on the ring member 85 that joins the rotary blade 70 with the gear 84. It should be noted that the rotation of the blades 70 are in the direction of the arrow shown at 87 on the gear ring 85. The blades 70 are somewhat curved as is shown in FIG. 7, and the direction of rotation is necessary so that the grass may be sheared and scissored off rather than captured or pinched off. Stationary blades 68 are preferably formed around the perimeter of the mower 10 into multiple sections, preferably three sections. The three sections are located with boundaries 120 degrees from each other and are equal in radial sweep, but the blades are formed as if on a radius from a center located on the opposite end of the diameter of the circular mower unit. In this way, the stationary blades 68 will be more aligned with the grass as they travel over the area to be mowed. Stationary blades 68 should also be sufficiently spaced so that fingers and other objects cannot be placed through the adjacent spaces of the stationary blades, for safety purposes.

Figure 8:
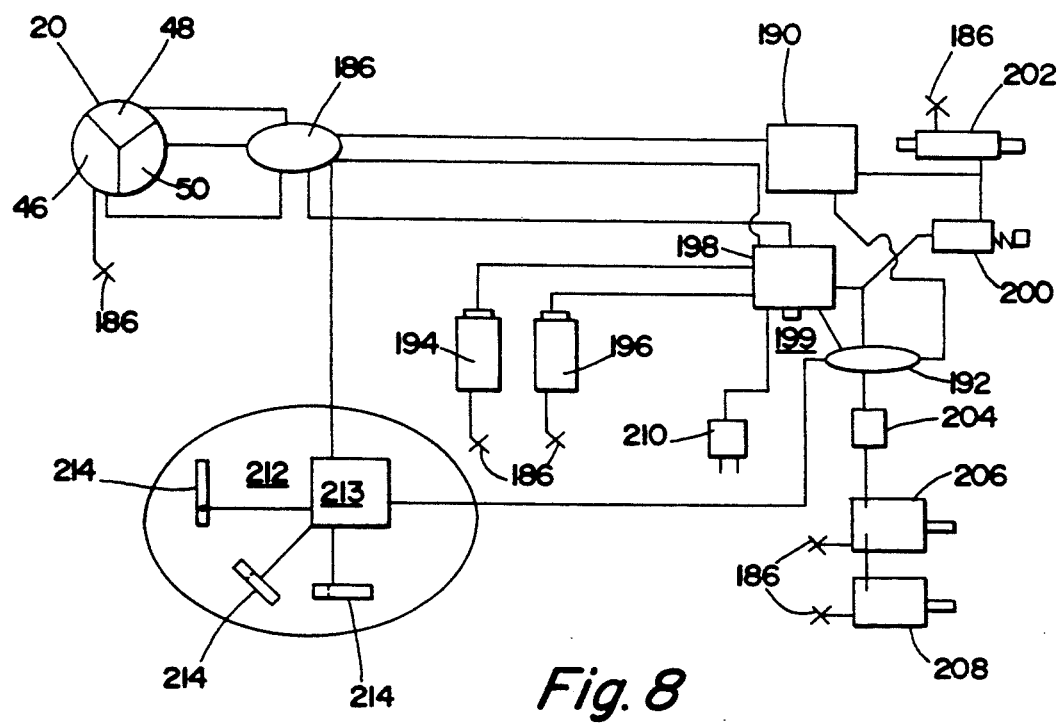
FIG. 8 is a schematic control diagram of the circuitry of the mowing machine according to the present invention.

Shown in FIG. 8 is an electrical schematic showing the electrical connections between the elements of the present invention. Starting with the solar panel 20, having the individual solar panels 46, 48, and 50, so as to understand the circuitry, the negative grounds are shown at 186. Connected to the solar panels is a comparator network circuit shown at 188. Comparator unit 188 compares the output of the individual solar cells in order to provide output information of each panel and total panel set. Comparator 188 is connected to switch-/relay 190 for activation of directional solenoid 202 based on information from network circuits 188 and 192. Comparator circuit 192, compares the charge energy levels of the batteries. The batteries shown at 194 and 196 are the same as was previously identified as 146 and 148. Comparator circuit 188 is also operably connected to switch/relay 198 for selection of the drive battery and recharge battery based on information from networks circuits 188 and 192. Switch/relay 198 is operatively connected to the obstacle contact 200 which has been previously identified as the contact switch 64 having contact 65 and 66 mounted on the bumper shell 12 and the inner frame 74. Directional solenoid 202 is representative of the magnets 168 and 170 which was the actuating mechanism for the turret actuator arm 162. The lift up switch shown at 204 has been previously shown and represented by contacts 138 and 134 in FIG. 4 being the lift up switch which shuts the mower off and/or sounds an alarm when the individual mower unit 10 is lifted off the ground. The wheel drive motor for the individual mower unit 10 is represented at 206 while the cutting unit mechanism drive motor is represented at 208. Drive motor 206 correspond to 112 in FIG. 4, and 208 corresponds with 76 in FIG. 4. Plug 210 is present in the circuitry as an alternate battery recharging circuit to augment the solar panels represented at 20 of the individual mower unit 10. Shown in FIG. 8 are the solar panel orientation actuators in circuit indicated at 212 with the actuators being 214 and corresponding with 92 and 90 combined as shown in FIG. 4. Circuit box 213 represents circuitry which makes the sun tracking circuitry operative. The electrical circuitry in FIG. 8 is designed to accommodate the two basic modes of the mower unit 10.

The present invention is a lawn mowing system comprised of a number of identical unattended random motion mowing devices interacting with each other and man-made or naturally occurring obstacles and boundaries.

For example, a pre-cut height of 2 inches will not be allowed to exceed a height of 2.5 inches at anytime during the growing season. This is accomplished by the repeated random trimming of the lawn throughout the growing season by the solar powered unattended random motion mowing devices.

Unattended operation of the system throughout the complete growing season is made possible by the use of solar powered self-propelled random motion mowing devices responding to permanent and/or transient obstacles and pre-existing and supplemental boundaries of infinite variety.

Virtually any boundary or obstacles extending above the predetermined maximum allowable grass height will cause a given mowing device to alter its direction of travel. The directional change of the device results from the completion of the electrical circuit at the outer shell on said device upon contact with said obstacle. The peripheral shell 12 in the preferred embodiment of the devices is the outermost ring.

Each mowing device consists of solar cells, rechargeable batteries, electric motors, drive and support wheels, cutting mechanism(s), control circuitry, and a support frame. The preferred embodiment is detailed by the herein included drawings and description section.

In the preferred embodiment, two nickel-cadmium batteries 194 and 196 (FIG. 8) or groups of batteries are incorporated into each mower to be utilized in a given system tailored to a specific lawn. It is apparent however that other type of rechargeable batteries may be considered.

Since nickel-cadmium batteries have been found to provide better service if allowed to fully discharge prior to being fully recharged, two batteries or groups of batteries are provided on the preferred embodiment of the herein disclosed mower, so that one is allowed to fully discharge while the other is being fully charged.

When the on board electronic circuitry FIG. 8, specifically item 192, detects a fully charged battery such as 194, and the photovoltaic output is above a minimum (by example only, slightly above zero) as detected by comparative network 188 the device will begin to operate, i.e., travel over the lawn and cut the grass.

This same fully charged detected battery 194, will continue to satisfy the power demands of the mower until it is fully discharged. Concurrently, the other battery 196 will be recharged by any and all available photovoltaic output.

Although it is intended, that under optimal conditions the photovoltaic output will be equal or greater than the power demands of the mower, it is recognized that one battery 194 or 196 will often become fully discharged before the other 194 or 196 is fully recharged. Thus, there will be periods of stand still recharging as determined by network 192 which will ensue until a fully charged battery is once again detected by 192 and the mower 10 will resume moving about and cutting the grass.

The stand still battery recharging time is minimized by the on board "shade avoidance system" comprised of comparator networks 188 and 192. Through simultaneous electronic monitoring of photovoltaic output by network 188 and battery charge level by network 192, the mowing device will avoid areas of unacceptable low solar intensity, by system activation of solenoid 202, thus changing mower direction.

The degree of solar intensity and remaining battery power are continuously monitored by networks 188 and 192. By monitoring changes in solar intensity and decreasing battery power level, the on board circuitry will cause the device to avoid areas of predetermined unacceptably low levels of solar intensity. For example, in times at which a full battery charge is monitored and a slight decrease in solar intensity is detected, the mowing device would continue to travel in the current direction of motion, thus entering a shaded area. However, at a lower level of battery charge, and a moderate decrease in solar intensity, the control circuitry would respond to the shaded area as if it were a physical obstacle or boundary and cause the device to alter its current direction by closing switch/relay 190 which causes a horizontal rotation of the drive and coaster wheels and concurrent rotation of the drive motor turret.

The choice to enter a shaded area or to avoid it is based on the present level of battery charge and the amount of decrease in solar panel output caused by the shade.

The preferred embodiment contains three photovoltaic panels or groups of panels, arranged in individual 120 degree sectors atop the circular shaped mower. Each panel or group of panels within a 120 degree sector will, at different times and locations, have a different output than the other two.

The shade avoidance system by monitoring this difference in individual panel output causes the electronic circuitry to alter the direction of the wheels by 120 degrees, so that the mower travels in the direction of the panel of the highest output.

The naturally occurring conditions of terrain insuring random motion of the mower(s) also cause the degree of directional change to be approximate.

Electrical circuitry found on each mowing device, permits the device to operate only during periods and/or in areas of predetermined levels of solar intensity, i.e., devices will not operate at night or at times and in locations of predetermined unacceptably low solar intensity.

To effect the repeated and unattended cutting of a selected region of grass, the selected region is first reviewed and subsequently bounded by man made or naturally occurring obstacles. For example, in locations where the selected mowing region is not naturally bounded by trees, shrubs or the like, a simple boundary of plastic, wood, stone, or other material, of users choice, would be placed at the desired mowing limits. The user of the system would then select the desired height of grass to be maintained. It must be noted here that due to the low power and thus, the inherent safe nature of the herein invention cutting device, the region of grass to be maintained, must be in a previously cut condition.

Upon bounding of the to be mowed region and selection of grass height, the user would place one or more of the cutting devices within the mowing region and bring it/them into operation by turning on the main power switch 199 on each device.

At this time the mowing system is complete and will operate without further user intervention.

Unattended operation consists of two distinct modes of operation.

I. Normal Operation Mode, in which the cutting device(s) is in motion, cutting grass and responding to obstacles within and on the border of the mowing zone.

During the Normal Operation Mode, the solar cells, through the control circuitry, are selectively charging one of the two on board batteries, while the drive motor/motors 206, cutting motor/motors 208, and control circuits are receiving power from the other battery.

During normal operation, on board control circuits continually monitor solar panel output and battery charge levels.

Using this information, the control circuitry causes the mowing device to respond to shaded areas of varying intensity as if they were physical obstacles or enter into the shaded area.

The choice to enter a shaded area or to change direction and avoid it is based on the present level of battery charge and the amount of decrease in solar panel output caused by the shade.

The Normal Operating Mode will stop under any one of three conditions:

1. Main power is turned off, which may be caused by simply lifting the device off the ground.
2. Drive Battery charge level is zero and the non-drive battery is not fully charged.
3. Solar panel power output is below a predetermined minimum.

When the normal operating mode is stopped, because the drive battery charge level is zero while the non-drive battery is not yet fully charged, the cutting device control circuitry will automatically switch to the stand-still Recharging Mode.

II. The Recharging Mode is a stand still mode of operation which is initiated under the circumstance that the battery that is supplying power to the drive and cutting motors has reached zero charge level and the other on board battery has not yet received a full charge. At this time, the mowing device will come to a stand still and the remaining battery charge will be used to power the on board sun tracking system 212. The sun tracking circuitry 212 will be activated and the solar panel(s) will continually track the sun for maximum solar power absorption.

Stand still recharging time will be minimized by this sun tracking feature. Upon full charge of one battery, normal operation will resume. The solar panels will return to their transport positions, with the remaining battery now receiving recharging power from the solar cells.

To summarize, the invented lawn mowing system, disclosed herein, will perform repeated unattended random grass cutting within a selected bounded region, for an indefinite period of time without user intervention or additional external power sources.

We claim:

1. A lawn mower which comprises:
   a. a frame;
   b. drive and coaster wheels mounted on said frame;
   c. a cutting mechanism mounted on said frame;
   d. electric motor means on said frame for individually driving said wheels and cutting mechanism;
   e. rechargeable energy means on said frame for powering said electric motor means;
   f. multiple solar panels on said frame for re-charging said energy means;
   g. means on said frame responsive to physical barriers to change the direction of travel of said wheels;
   h. means for monitoring the output of said solar panels and said energy means so as to alter the operation of the mower to optimize the use of the available solar intensity.

2. The lawn mower according to claim 1 which further includes means for tracking the direction of optimum solar intensity and aligning said solar panels with said optimum solar intensity direction.

3. The lawn mower according to claim 1 in which said means responsive to physical barriers comprises contact sensors on the radially outward side of said frame.

4. The lawn mower according to claim 1 in which said re-chargeable energy means on said frame comprises a pair of storage batteries.

5. The lawn mower according to claim 4 in which said storage batteries comprise nickel-cadmium storage batteries.

6. The lawn mower according to claim 5 which further includes means for operating said power requirements of said mower from one of said batteries while re-charging said other battery.

7. The lawn mower according to claim 6 which further includes means for completely discharging the operating battery before re-charging said battery.

8. The lawn mower according to claim 1 in which said multiple solar panels comprise three individual panels on vertical centerlines one hundred twenty degrees apart from one another.

9. The lawn mower according to claim 1 in which said solar panels are panels of photovoltaic cells.

10. The lawn mower according to claim 9 in which said solar panels are comprised of photovoltaic cells.

11. The lawn mower according to claim 1 which further comprises circuitry means on said mower for activating and deactivating said mower operation depending on said solar intensity.

12. The lawn mower according to claim 11 which further comprises circuitry means on said mower for avoiding shaded areas during certain parts of said mower operation.

13. The lawn mower according to claim 12 in which said circuitry means on said mower for avoiding shaded areas comprises monitoring means for detecting solar energy output and energy charge levels so as to avoid shaded areas under predetermined conditions.

14. The lawn mower according to claim 1 which further includes means for automatically starting and stopping said mower operations that are determined by predetermined levels of energy level charge and solar panel output.

15. The lawn mower according to claim 1 in which said cutting mechanism comprises co-operating elements of shearing blades including a stationary blade and a rotary blade for trimming the tips of the grass to a predetermined height.

16. The lawn mower according to claim 7 in which said cutting mechanism comprises co-operating elements of shearing blades including a stationary blade and a rotary blade for trimming the tips of the grass to a predetermined height.

17. The lawn mower according to claim 12 in which said cutting mechanism comprises co-operating elements of shearing blades including a stationary blade and a rotary blade for trimming the tips of the grass to a predetermined height.

18. The lawn mower according to claim 14 in which said cutting mechanism comprises co-operating elements of shearing blades including a stationary blade and a rotary blade for trimming the tips of the grass to a predetermined height.

19. The lawn mower according to claim 2 in which said cutting mechanism comprises co-operating elements of shearing blades including a stationary blade and a rotary blade for trimming the tips of the grass to a predetermined height.

20. The method of mowing a lawn which comprises the steps of:
   a. providing a physical barrier around the perimeter of an area to be mowed;
   b. providing a self-driven unattended solar rechargeable battery powered mowing devices within the perimeter of the area to be mowed;
   c. providing battery means for operating the mowing device;
   d. providing actuation means controlled by monitoring devices that detect and compare solar electrical energy output with battery charge level;
   e. providing contact sensors on said mowing devices that upon contact with said physical barrier operatively changes the direction of said mowing devices by more than 90 degrees.

21. The method of mowing a lawn according to claim 20 which further includes the step of providing two batteries for said battery means, with one of said two batteries for driving said mowing device and the other of said two batteries for accepting a charge from said solar electrical output means, and circuitry for switching the connections between batteries when said drive battery charge is depleted and said other battery is fully charged.

22. The method of mowing a lawn according to claim 21 which further includes the step of starting said mower operation when said monitors detect a fully charged battery and a solar energy output greater than zero with said fully charged battery being the drive battery.

23. The method of mowing a lawn according to claim 21 which further includes the step of stopping said mower operation when the charge on said drive battery is depleted and said other battery is not fully charged.

24. The method of mowing a lawn according to claim 21 which further includes changing the direction of the mowing device when the battery charge levels are below a pre-determined level and the solar energy electrical output is below a pre-determined level.

25. The method of mowing a lawn according to claim 20 which further includes the step of providing solar panels on said mowing device to provide said solar energy electrical output.

26. The method of mowing a lawn according to claim 25 which further includes a swivel mount and motor means for each said solar panel and means for controlling the panels so that they face towards the direction of greatest solar intensity.

* * * * *